United States Patent [19]

Deshpande et al.

[11] Patent Number: 5,266,769
[45] Date of Patent: Nov. 30, 1993

[54] PROCESS FOR INDEPENDENT CONTROL OF CROWN AND CAMBER FOR MAGNETIC HEAD SLIDER

[75] Inventors: Annayya P. Deshpande; Randall T. Kerth; Henri M. Nier, all of San Jose, Calif.

[73] Assignee: International Business Machines Corporation, Armonk, N.Y.

[21] Appl. No.: 841,934

[22] Filed: Feb. 25, 1992

[51] Int. Cl.⁵ .................. B23K 26/00; B24C 1/10
[52] U.S. Cl. ................. 219/121.69; 219/121.73; 51/319; 51/326
[58] Field of Search ........... 51/281 R, 319, 320, 51/413, 324, 310, 165 R, 326; 72/53; 219/121.69, 121.68, 121.73, 121.66; 29/603

[56] References Cited

U.S. PATENT DOCUMENTS

| | | | |
|---|---|---|---|
| 2,701,408 | 2/1955 | Borger | 72/53 |
| 3,000,425 | 9/1961 | Hodges et al. | 72/53 |
| 4,301,353 | 11/1981 | Suenaga et al. | 219/121 LJ |
| 4,329,862 | 5/1982 | Harburn et al. | 72/53 |
| 4,517,041 | 5/1985 | Hennenfent et al. | 51/324 |
| 4,835,361 | 5/1989 | Strom | 219/121.68 |
| 4,912,883 | 4/1990 | Chang et al. | 51/165 R |
| 4,914,868 | 4/1990 | Church et al. | 51/165.71 |
| 4,948,460 | 8/1990 | Sandaiji | 219/121.69 |
| 5,117,589 | 6/1992 | Bischoff et al. | 51/216 A |
| 5,142,778 | 9/1992 | Smolinski et al. | 219/121.66 |

FOREIGN PATENT DOCUMENTS 0034777 2/1987 Japan ..................... 51/319

*Primary Examiner*—Robert A. Rose
*Attorney, Agent, or Firm*—Leslie G. Murray

[57] ABSTRACT

A method for making a magnetic head slider comprising the steps of lapping the slider to form an air bearing surface, producing a chosen pattern of rails on the air bearing surface, and producing a chosen pattern of stress on the back side of the slider to remove the distortion produced in the slider by the lapping and rail formation steps. The stress pattern can be chosen to produce any desired range of crown and camber for the slider.

8 Claims, 3 Drawing Sheets

PROCESS FOR INDEPENDENT CONTROL OF CROWN AND CAMBER FOR MAGNETIC HEAD SLIDER

This invention relates to magnetic head sliders and, more particularly, to a process for making a magnetic head slider in which crown and camber of the slider can be independently controlled.

DESCRIPTION OF THE PRIOR ART

Magnetic head assemblies that fly relative to magnetic media have been used extensively, and these assemblies are commonly referred to as magnetic head sliders. These assemblies provide a on-contact transducing relationship between a magnetic transducer and a magnetic recording medium, such as a rotating magnetic disk, so that a stable constant spacing can be maintained between the transducer and the disk. In magnetic recording technology it is continually desired to improve the areal density at which information can be recorded and reliably read. This desire has lead to a trend toward greater bit density along a magnetic recording track and a shrinking track width. Another change that is usually required is a lower flying height, so it becomes more difficult to maintain the lower flying height constant to the degree required to reliably record and read data at the higher data rates.

The prior art process for making a magnetic head slider involves a lapping process in which the air bearing surface (ABS) is defined and a subsequent process in which a pattern of rails is produced on the ABS. For example, U.S. Pat. No. 4,912,883 describes a lapping system in which the magnetic head assembly includes an inductive read/write head, and U.S. Pat. No. 4,914,868 describes a lapping system in which the magnetic head assembly includes a magnetoresistive write transducer. The pattern of rails can be produced by etching, ion milling, or other machining technique, or by laser ablation as described in U.S. Pat. No. 4,301,353.

The prior art processes for making a magnetic head slider produce substantial stress on the slider. The resulting distortion produces a concave surface on the lapped ABS surface which leads to negative crown and camber. Negative crown and camber make it more difficult to meet the desired design requirements since flying height is strongly affected by crown and camber.

SUMMARY OF THE INVENTION

It is therefore the principal object of this invention to provide a method for making a magnetic head slider in which a chosen pattern of stresses is produced on the slider so that the required magnitude and tolerance of crown and camber can be achieved.

In accordance with the invention, a method for producing a magnetic head slider comprises the steps of lapping a first face of the slider to a predetermined dimension to produce an air bearing surface, producing a chosen pattern of rails on the first face of the slider, and producing a chosen pattern of stress on the face of the slider opposite the first face to produce a chosen crown and camber characteristic for the slider.

The stresses generated in the lapping step and in the step of producing a pattern of rails on the air bearing surface lead to both negative crown and negative camber which is undesireable. The chosen pattern of stress that is produced on the back side of the slider is designed to remove the distortion produced by the lapping and rail formation steps and produce a slider having the desired crown and camber.

In a specific embodiment the selected localized changes in stress are achieved by selectively removing material from the rear of the slider without introducing a new highly stressed material on the surface. One suitable technique utilizes a laser to selectively ablate the stressed material from the rear of the slider, and another suitable technique utilizes micro sand blasting to produce the stress changes.

For a fuller understanding of the nature and advantages of the present invention reference should be made to the following detailed description taken in conjunction with the accompanying drawings.

DESCRIPTION OF THE PREFERRED EMBODIMENT

The prior art process for making a magnetic head slider develops stresses during the manufacturing process which may produce undesirable crown and camber characteristics in the slider. The present invention introduces changes in the manufacturing process which enable the production of a chosen pattern of stress in the slider so that the required magnitude and tolerance on crown and camber can be achieved.

Prior to a detailed description of the present invention, a typical magnetic head slider and the prior art process for producing this slider will be briefly described. An air bearing surface (ABS) is provided on the primary surface of the slider body, i. e. on the side of the slider to be directed to the surface of the recording medium, such as a disk, for example. The ABS may comprise positive or negative pressure producing surface(s).

Figure 1:
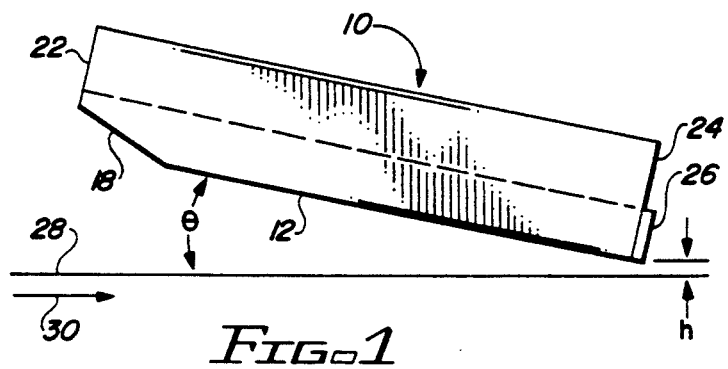
FIG. 1 is a side elevation view of a magnetic head slider.
Figure 3:
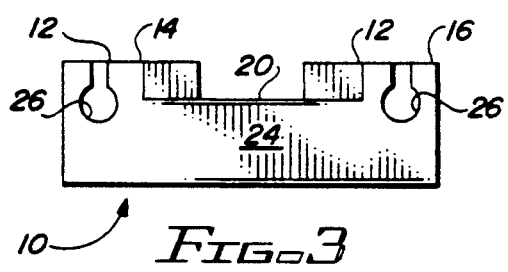
FIG. 3 is a view of the trailing end of the slider of FIG. 1.
Figure 2:
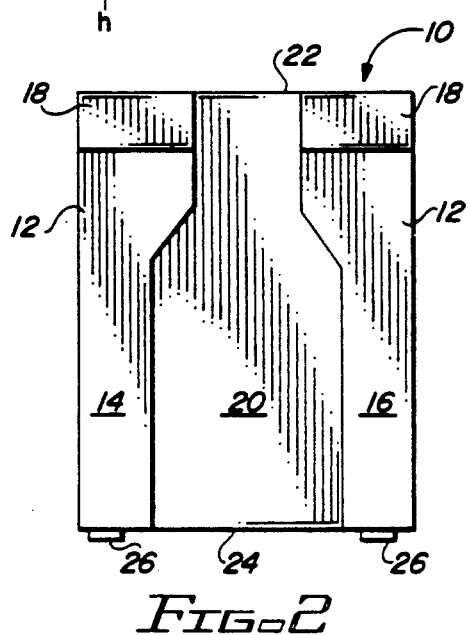
FIG. 2 is a bottom plan view of the magnetic head slider of FIG. 1.

In the specific embodiment shown in FIGS. 1, 2 and 3, the ABS 12 of the slider 10 is formed with two side rails 14 and 16, each having a taper section 18 at its leading end. The inner sides of the two side rails border on a recessed section 20 which is formed by etching, ion milling, or other machining technique, and the recessed section 20 extends from the leading end 22 to the trailing end 24 of the slider 10. At least one magnetic transducer 26, preferably of the thin film type, is formed on the trailing end 24 of the slider 10.

The side rails 14, 16 and the taper sections 18 provide different pressure components that are formed when the slider 10 is positioned adjacent to a magnetic surface 28 moving in the direction of arrow 30 to produce load forces on the slider that are balanced in such a manner that the desired flying characteristics for the slider can be achieved. The pressure components are combined so that the slider flies at a desired pitch angle relative to a moving magnetic disk surface 28 with an attitude by which the trailing end 24 of the slider 10, where the transducer 24 is mounted, is closest to the disk surface 28.

The desired flying characteristics for the slider 10 require that the slider develop an air bearing to maintain a very close spacing h between the magnetic transducer 26 and the recording surface 28, and that this spacing be maintained substantially constant during and after accessing of the slider from track to track on the recording surface 28.

It has been found that two important characteristics of the slider necessary to achieve and maintain the desired flying characteristics for the slider are crown and camber. Crown is the deviation from a planar surface in the direction of air flow with a concave shape defined as negative crown and a convex shape defined as positive crown. Camber is the deviation from a planar surface in a direction normal to the direction of air flow and a concave shape is defined as negative camber and a convex shape is defined as positive camber. Neither negative crown nor negative camber is desired for sliders since this not only leads to variation in the flying height but also makes it more likely that the edges of the slider will damage the recording medium should there be inadvertant contact with the recording medium.

The method for making a magnetic head slider, according to the present invention, involves the technique in which a large number of transducers are produced on a wafer in columns and rows, and the rows are mechanically separated so that a number of the transducers are positioned in a side-by-side relationship in the row. The rows are then lapped to the point at which the magnetic transducers have the desired magnetic characteristics, and the lapped surface of the row forms what will be the ABS when the row is separated into individual sliders. A desired rail pattern is then produced on the ABS. Both the rail forming process and the lapping process produce stresses within the row which generally lead to both negative crown and negative camber when the row is removed from the lapping tool.

According to the present invention, the step of lapping the rows may be carried out as described in commonly asssigned U.S. Pat. No. 4,912,883 in which the saturated current for an inductive head is the characteristic used for control of the lapping process. Alternatively, the lapping of the rows may be carried out as described in commonly assigned U.S. Pat. No. 4,914,868 in which the resistance of a magnetoresistive element is the characteristic used for control of the lapping process. The step of producing a chosen pattern of rails on the ABS can be carried out by etching, ion milling or other machining technique.

Figure 4:
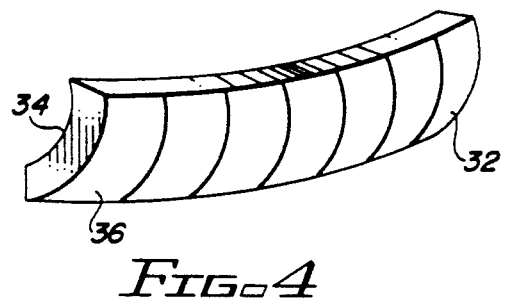
FIG. 4 is a sketch showing a distorted row of lapped magnetic heads.

A typical row 32 which has been removed from the lapping tool is shown in FIG. 4. The row 32 is distorted due to the difference in stresses built up between the ABS side 34 of the row 32 which is lapped to a very fine surface finish and the back side 36 of the row 32 which may be only rough lapped. This distortion produces both a negative crown and a negative camber.

According to the present invention, the crown and camber can be controlled independently by selctively removing stresses from the slider thereby creating a controlled stress pattern which will result in the desired crown and camber. The stresses are altered in a specific embodiment by selectively removing stresses from the back of the slider in a controlled pattern, such as a pattern of stripes or dots, for example.

Figure 5:
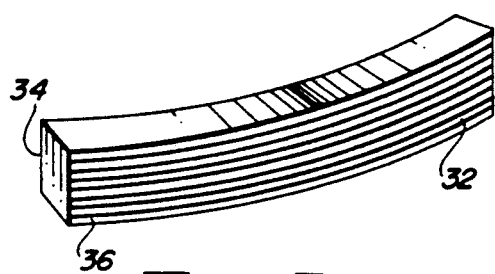
FIG. 5 is a sketch showing the row of FIG. 4 with crown distortion removed.

FIG. 5 shows an example of the use of a pattern of stripes along the row 32 to remove the crown distortion. Other patterns can also be used to remove the crown distortion. Although the crown distortion is shown to be corrected to a zero crown, it is apparent that the crown can be set to a selected positive or negative value by the use of the illustrated technique.

Figure 6:
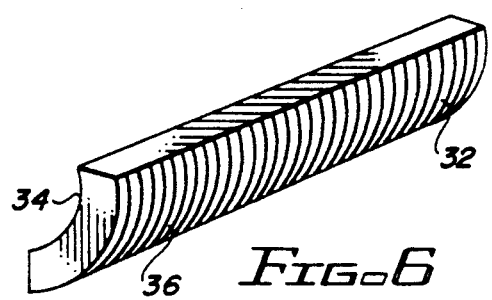
FIG. 6 is a sketch showing the row of FIG. 4 with camber distortion removed.

FIG. 6 shows an example of the use of a pattern of stripes substantially normal to the row 32 to remove the camber distortion in row 32. Patterns can be chosen to simultaneously correct for both the crown and camber distortion and either produce a row 32 free o distortion, or produce a row having crown and camber of a selected positive or negative value. The correction for the distortion in the row 32 can be accomplished while the sliders are still in row form as shown in the drawings, or, alternatively, after the sliders in the row have been separated into individual sliders.

The stresses may be removed by any suitable technique in which a selected localized change in stress can be achieved. One suitable technique is to selectively remove stressed material from the back surface of the slider without introducing a new highly stressed material on the surface, thereby creating the desired crown an camber compensating stress field.

One suitable technique to produce the stress changes is by the use of a laser to selectively ablate the stressed material from the back surface of the slider to reduce the compressive stress thereby creating the desired crown and camber compensating stress field.

Another suitable technique to produce the stress changes is by means of micro sand blasting to selectively increase the compressive stress in the material on the back side 36 of the slider thereby creating the desired crown and camber compensating stress field.

Two techniques for varying the stress on the back side of the slider have been disclosed. By the appropriate choice of the method and degree of treatment, the chosen variation of stress on the back side of the slider can be produced to counteract the stresses built up n the ABS side of the slider and achieve the desired crown and camber.

Figure 7:
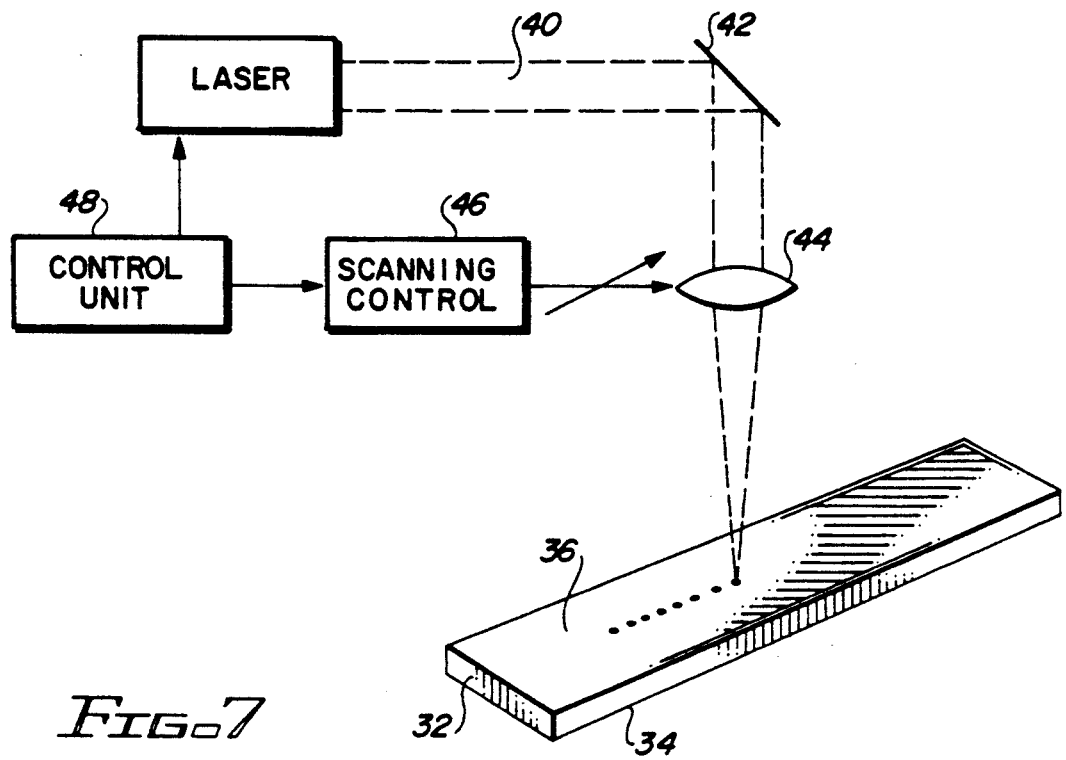
FIG. 7 is a schematic diagram of the apparatus for controlling crown and camber in a first mode of control.

The control of the stress changes can be made as a result of patterning that has been correlated, based on prior measurements, to produce a predicted crown and camber change. An apparatus suitable for this mode of control is shown in FIG. 7. This apparatus comprises a collimated laser beam 40 which is directed toward row 32 by means of moveable mirror 42, and the beam 40 is focused on row 32 by means of a suitable lens 44. Beam 40 can be produced by any suitable laser such as a YAG laser, for example. The choice of lasers is dependent upon the material of the slider and the extent of material removal required to produce the desired stress field. In a specific embodiment in which the slider material is a ceramic material comprising a mixture of TiC and alumina, a laser has been found to be suitable which has a spot size of 30 microns and sufficient laser power to produce a stressed region about 10 microns deep. In this mode of control, the deviation from flatness of the row 32 was measured and stored, and a control unit 48, which includes a microprocessor, accesses the stored data in the form of a look-up table, for example, to control the intensity of the laser beam 40 and its position on row 32 by means of x-y scanner 46 which provides control of the motion for mirror 42 and lens 44 to scan the focused beam over the selected part of the back side 36 of the row 32. A tool commonly used in the semiconductor industry for trimming resistors, such as an ESI Resistor Trimming Tool, for example, can be used for this purpose.

Figure 8:
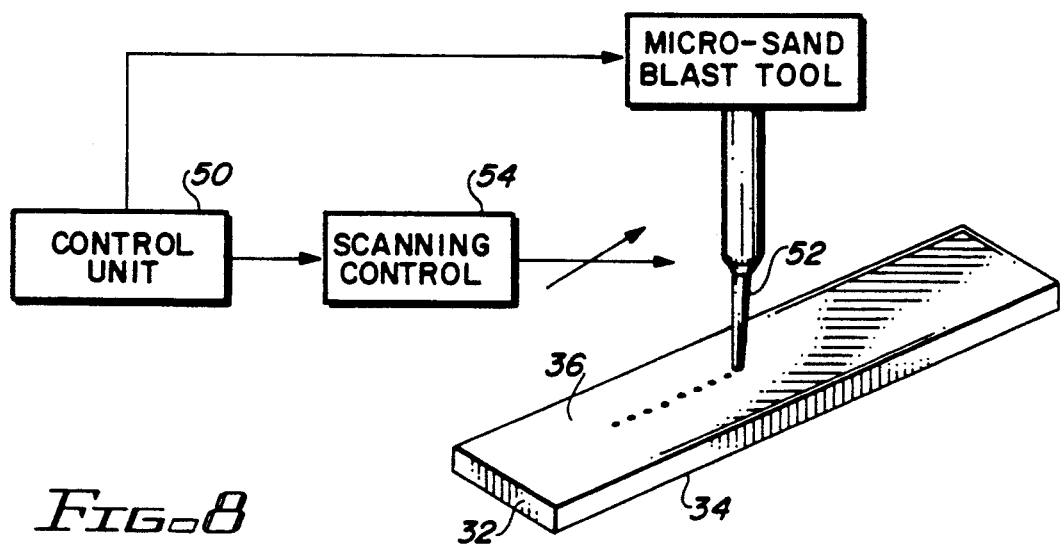
FIG. 8 is a schematic diagram of an alternate embodiment of the apparatuses for controlling crown and camber in the first mode of operation.

Another apparatus suitable for this process is shown in FIG. 8. This apparatus utilizes a micro sand blasting tool to create the compensating stress fields. This apparatus functions to eject a crushed alumina powder, having a particle size of about 50 microns, under a pressure of 30-100 psi through a small nozzle toward a workpiece which results in a pattern of increased stress. One suitable example is Air Abrasive Processing Equipment by Swan Technologies Corp. In this apparatus a control unit 50 controls the duration and pressure of the powder ejection as well as the position of the nozzle 52 relative to row 32 through scanner 54.

Figure 9:
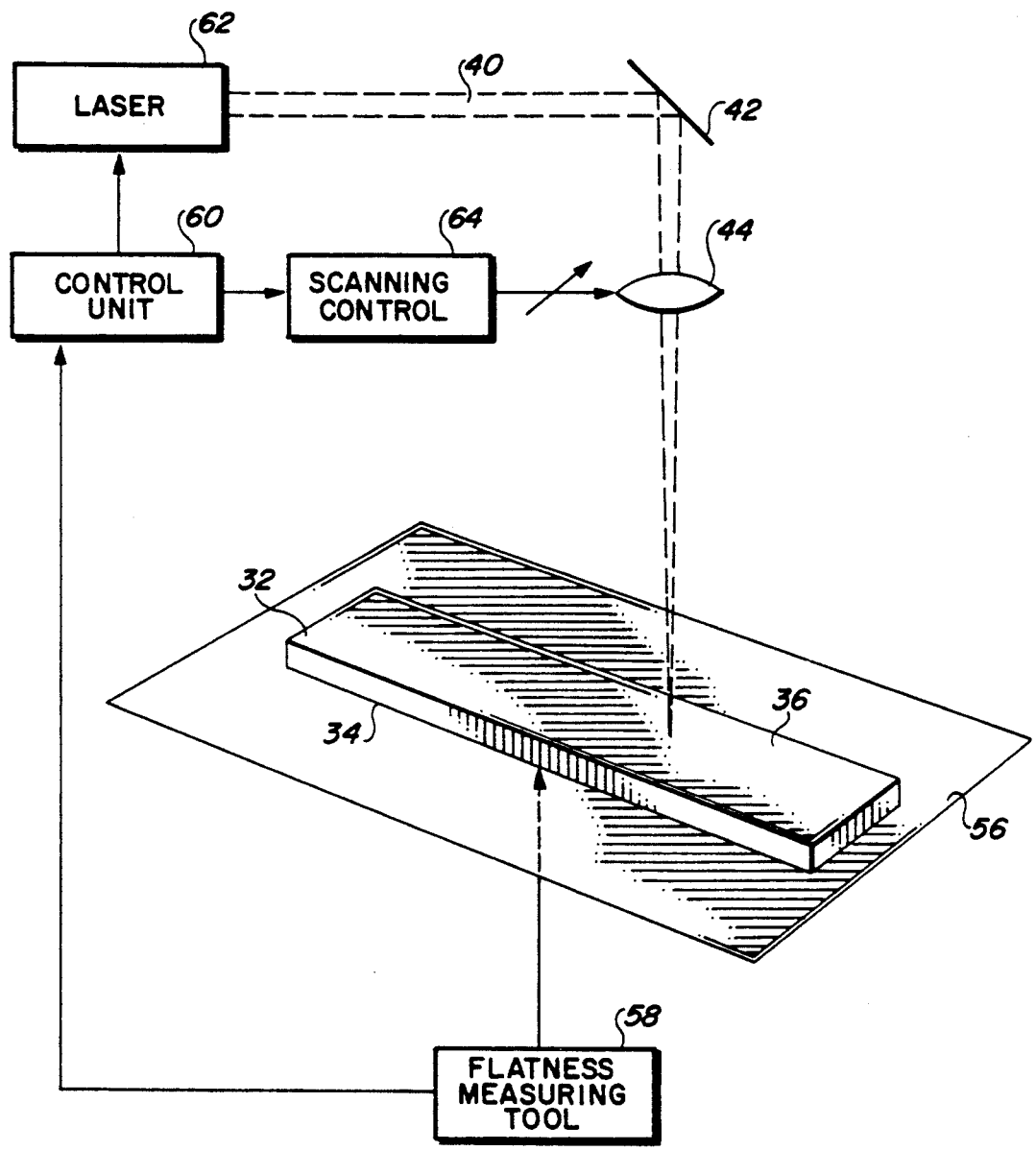
FIG. 9 is a schematic diagram of the apparatus for controlling the crown and camber in a second mode of control.

In an alternate control technique, control of the stress changes may be achieved as a result of monitoring the crown and camber condition of the ABS during stressed material removal. The stress changes continuously until the desired crown and camber characteristics are achieved. This technique can be carried out by the use of the apparatus shown in FIG. 9. The apparatus comprises a suitable support member 56 for supporting row 32 with the ABS side 34 in contact with support member 56. A flatness measuring tool 58 senses the ABS side 34 of the row 32 and couples this flatness information to a control unit 60 where this flatness information is compared to the desired flatness. Should this comparison indicate that the flatness is still out of specification, then the control unit 60 sends control signals to the laser 62 and the scanner 64 to provide additional stress changes on the back side 36 of the row 32. The flatness measuring tool 58 may comprise a contact profilometer in which case support member 56 has an opening for the profilometer to contact the ABS side 34 of the row 32. Alternatively, the flatness measuring tool 58 may comprise an optical device, such as an optical interferometer, in which case the support member 56 would have a transparent area by which the back side 36 of the row 32 can be accessed optically.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A method for producing a magnetic head slider comprising the steps of:
    lapping a first face of said slider to a predetermined dimension to produce an air bearing surface;
    producing a chosen pattern of rails on said first face of said slider; and
    producing a chosen pattern of stress on the face of said slider opposite said first face to produce a chosen crown and camber characteristic for said slider, said chosen pattern of stress being formed by selective laser ablation of material from the face of said slider opposite said first face.

2. The method for producing a magnetic head slider of claim 1 wherein said chosen pattern of stress is produced in response to prior measurement of changes in crown and chamber.

3. The method for producing a magnetic head slider of claim 1 wherein said chosen pattern of stress is produced in 4. The method for producing a magnetic head slider of claim 3 wherein said chosen pattern of stress is a compressive stress.

5. A method for producing a plurality of magnetic head sliders comprising the steps of:
    producing a plurality of magnetic head sliders in a row in side-by-side relationship;
    lapping a first face of said sliders to a predetermined dimension to produce an air bearing surface for each of said plurality of sliders;
    producing a chosen pattern of rails on said first face of each of said plurality of sliders; and
    producing a chosen pattern of stress on the face of each of said plurality of sliders opposite said first face to produce a chosen crown and camber characteristic for each of said plurality of sliders, said chosen pattern of stress being formed by selective laser ablation of material from the face opposite said first face of each of said plurality of sliders.

6. The method for producing a plurality of magnetic head sliders of claim 5 wherein said chosen pattern of stress is produced in response to prior measurement of changes in crown and camber.

7. The method for producing a plurality of magnetic head sliders of claim 5 wherein said chosen pattern of stress is produced in response to measurement of changes in crown and camber as said stress is produced.

8. The method for producing a magnetic head slider of claim 7 wherein said chosen pattern of stress is a compressive stress.

* * * * *

UNITED STATES PATENT AND TRADEMARK OFFICE
CERTIFICATE OF CORRECTION

PATENT NO. : 5,266,769
DATED : November 30, 1993
INVENTOR(S) : Deshpande et al.

It is certified that error appears in the above-indentified patent and that said Letters Patent is hereby corrected as shown below:

Column 4, line 20, delete "o", insert -- of --.

Column 4, line 33, delete "an", insert -- and --.

IN THE CLAIMS

Column 6, line 23, after "in", insert -- response to measurement of changes in crown and camber as said stress is produced. --.

Signed and Sealed this

Ninth Day of May, 1995

Attest:

BRUCE LEHMAN

Attesting Officer

Commissioner of Patents and Trademarks